(12) United States Patent
Meng et al.

(10) Patent No.: US 12,469,926 B2
(45) Date of Patent: Nov. 11, 2025

(54) BATTERY CELL, COVER ASSEMBLY, BATTERY, ELECTRIC APPARATUS, METHOD, AND DEVICE

(71) Applicant: CONTEMPORARY AMPEREX TECHNOLOGY (HONG KONG) LIMITED, Hong Kong (CN)

(72) Inventors: Wanqiu Meng, Ningde (CN); Qian Liu, Ningde (CN); Yonghuang Ye, Ningde (CN); Yulian Zheng, Ningde (CN); Longfei Xue, Ningde (CN); Xiaoxi Zhang, Ningde (CN); Peng Wang, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 434 days.

(21) Appl. No.: 18/064,933

(22) Filed: Dec. 13, 2022

(65) Prior Publication Data

US 2023/0114679 A1 Apr. 13, 2023

Related U.S. Application Data

(63) Continuation of application No. PCT/CN2021/121387, filed on Sep. 28, 2021.

(51) Int. Cl.
*H01M 50/147* (2021.01)
*H01M 50/30* (2021.01)

(52) U.S. Cl.
CPC ....... *H01M 50/394* (2021.01); *H01M 50/147* (2021.01)

(58) Field of Classification Search
CPC .. H01M 50/394; H01M 50/30; H01M 50/147; H01M 50/572; H01M 50/3425; H01M 2220/20; H01M 2200/20
See application file for complete search history.

(56) References Cited

U.S. PATENT DOCUMENTS

2017/0237059 A1* 8/2017 Li .................. H01M 50/147
                                                       429/61
2018/0166675 A1* 6/2018 Wang ............ H01M 50/147
(Continued)

FOREIGN PATENT DOCUMENTS

CN       208507798 U       2/2019
CN       109920953 A       6/2019
(Continued)

OTHER PUBLICATIONS

The extended European search report received in the corresponding European Application 21939978.9, mailed Feb. 9, 2024.
(Continued)

*Primary Examiner* — Dah-Wei D. Yuan
(74) *Attorney, Agent, or Firm* — K&L Gates LLP

(57) ABSTRACT

A battery cell, a cover assembly, a battery, an electric apparatus, a method, and a device are provided. The battery cell includes an electrode assembly and a housing to accommodate the electrode assembly. A wall portion of the housing includes a body portion and a fastener, the fastener is provided with a recess communicating with the outside, and the recess is arranged on an inner surface of the fastener facing the electrode assembly and recessed in a direction leaving the electrode assembly. An air-permeable member covers the recess, and the air-permeable member is configured to allow gas to be discharged to the outside of the housing through the recess when a gas pressure inside the housing reaches a threshold. A bottom wall of the recess is provided with a protruding portion extending toward the electrode assembly, and the protruding portion is configured to be attached to the air-permeable member.

19 Claims, 8 Drawing Sheets

(56) References Cited

U.S. PATENT DOCUMENTS

2019/0245174 A1* 8/2019 You .................... H01M 50/325
2020/0212379 A1* 7/2020 Shi .................... H01M 10/0472
2021/0396324 A1* 12/2021 Nakayama .......... H01M 50/383

FOREIGN PATENT DOCUMENTS

| | | |
|---|---|---|
| CN | 110429214 A | 11/2019 |
| CN | 210628352 U | 5/2020 |
| CN | 111384348 A | 7/2020 |
| CN | 212182380 U | 12/2020 |
| CN | 212625947 U | 2/2021 |
| CN | 112467300 A | 3/2021 |
| CN | 213583979 U | 6/2021 |
| CN | 213782158 U | 7/2021 |
| JP | 2002319385 A | 10/2002 |
| JP | 2003123720 A | 4/2003 |
| JP | 2006125559 A | 5/2006 |
| JP | 2011159498 A | 8/2011 |
| JP | 2014209524 A | 11/2014 |
| JP | 2018073700 A | 5/2018 |
| WO | 2021112084 A1 | 6/2021 |
| WO | 2022087919 A1 | 5/2022 |

OTHER PUBLICATIONS

Notice of Reasons for Refusal received in the counterpart Japanese Application 2022-566493, mailed on May 29, 2024.
Notice of Reasons for Refusal received in the corresponding Japanese Application 2022-566493, mailed Dec. 1, 2023.
International Search Report received in International Application PCT/CN2021/121387, mailed Apr. 25, 2022.
The Decision to Grant a Patent received in the counterpart Japanese application 2022-566493, mailed on Nov. 29, 2024.

* cited by examiner

BATTERY CELL, COVER ASSEMBLY, BATTERY, ELECTRIC APPARATUS, METHOD, AND DEVICE

CROSS-REFERENCE TO RELATED APPLICATIONS

This application is a continuation of International Application PCT/CN2021/121387, filed Sep. 28, 2021 and entitled "BATTERY CELL, COVER ASSEMBLY, BATTERY, ELECTRIC APPARATUS, METHOD, AND DEVICE", which is incorporated herein by reference in its entirety.

TECHNICAL FIELD

The present disclosure relates to the field of battery technologies, and in particular, to a battery cell, a cover assembly, a battery, an electric apparatus, a method, and a device.

BACKGROUND

Rechargeable battery cells have been widely used in electric vehicles due to the advantages of high energy density, high power density, long cycle life, long storage time, and the like. Currently, the safety of gas discharge of battery cells is constraining the development of battery cells, and therefore technology related to safety performance of battery cells has become one of the subjects of research.

SUMMARY

Embodiments provide a battery cell, a cover assembly, a battery, an electric apparatus, a method, and a device. The battery cell can alleviate battery safety problems caused by gas discharge.

According to a first aspect, this application provides a battery cell, including an electrode assembly, a housing, and an air-permeable member. The housing is configured to accommodate the electrode assembly, where a wall portion of the housing includes a body portion and a fastener, the fastener is provided with a recess communicating with the outside, and the recess is arranged on an inner surface of the fastener facing the electrode assembly and recessed in a direction leaving the electrode assembly. The air-permeable member covers the recess and is configured to allow gas to be discharged to the outside of the housing through the recess when a gas pressure inside the housing reaches a threshold. A bottom wall of the recess is provided with a protruding portion extending toward the electrode assembly, and the protruding portion is configured to be attached to the air-permeable member, so as to limit deformation of the air-permeable member in a thickness direction of the wall portion.

In the technical solution in this embodiment of this application, a wall portion of a housing includes a body portion and a fastener. The fastener is provided with a recess communicating with the outside, where the recess is arranged on an inner surface of the fastener facing an electrode assembly and recessed in a direction leaving the electrode assembly. An air-permeable member covers the recess and allows gas to be discharged to the outside of the housing when a gas pressure inside the housing reaches a threshold, meeting the gas discharge requirement. The bottom wall of the recess is provided with a protruding portion extending toward the electrode assembly, and the protruding portion is attached to the air-permeable member, which can support a side of the air-permeable member facing away from the electrode assembly in the thickness direction, so as to limit deformation of the air-permeable member in the thickness direction of the wall portion under an action of gas inside the housing, thereby slowing down aging of the air-permeable member.

In some embodiments, an accommodating cavity communicating with the outside is formed between an outer peripheral wall of the protruding portion and an inner peripheral wall of the recess, the bottom wall of the recess is provided with a first through hole, and the first through hole is configured to allow gas circulation with the inner space of the battery cell through the accommodating cavity. The accommodating cavity communicating with the outside is formed between the outer peripheral wall of the protruding portion and the inner peripheral wall of the recess, and the bottom wall of the recess is provided with the first through hole, which can not only ensure that a requirement for discharging the gas inside the battery cell through the accommodating cavity and the first through hole is met, but also facilitate arrangement of the protruding portion so that the protruding portion can be attached to the air-permeable member so as to limit the deformation of the air-permeable member in the thickness direction.

In some embodiments, the first through hole is provided in plurality, and the plurality of first through holes are spaced apart. The first through hole is provided in plurality so that a gas discharge rate can be guaranteed and safety performance of the battery cell can be improved.

In some embodiments, the protruding portion includes a first protrusion, and the accommodating cavity communicating with the outside is formed between an outer peripheral wall of the first protrusion and the inner peripheral wall of the recess. With the above arrangement, the protruding portion can be attached to the air-permeable member via the first protrusion, and the gas inside the battery cell can be discharged through the accommodating cavity formed between the first protrusion and the recess. Therefore, the deformation of the air-permeable member in the thickness direction can be limited on the basis that the gas discharge requirement is met.

In some embodiments, the protruding portion includes a first protrusion and a second protrusion, where the second protrusion surrounds the first protrusion and is spaced apart from the first protrusion, the accommodating cavity communicating with the outside is formed between an outer peripheral wall of the first protrusion and an inner peripheral wall of the second protrusion, and the accommodating cavity communicating with the outside is formed between an outer peripheral wall of the second protrusion and the inner peripheral wall of the recess. With the above arrangement, the protruding portion can be attached to the air-permeable member via the first protrusion and the second protrusion at the same time, thereby effectively limiting the deformation of the air-permeable member in the thickness direction. Moreover, the gas inside the battery cell can be discharged through the accommodating cavity between the first protrusion and the second protrusion and the accommodating cavity between the second protrusion and the recess, thereby meeting the gas discharge requirement of the battery cell and improving safety performance of the battery cell.

In some embodiments, two or more second protrusions are provided, the two or more second protrusions are coaxially spaced apart, and the accommodating cavity communicating with the outside is formed between two adjacent second protrusions. With the above arrangement, each second protrusion can be attached to the air-permeable member, so that attachment area between the protruding portion and the air-permeable member is increased, and a deformation probability of the air-permeable member in the thickness direction is reduced. In addition, the accommodating cavities communicating with the outside being formed between the first protrusion and the second protrusion, between adjacent second protrusions, and between the second protrusion and the recess can increase the gas discharge rate, thereby improving safety performance of the battery cell.

In some embodiments, the body portion includes a second through hole, the second through hole is configured to accommodate the fastener, and the fastener is configured to connect the air-permeable member and the body portion. With the above arrangement, the fastener and the body portion can be disposed separately, thereby facilitating formation of structures such as the recess and the protruding portion.

In some embodiments, the second through hole includes a first hole section and a second hole section in an axial direction of the second through hole, a radial dimension of the first hole section is greater than a radial dimension of the second hole section, a transition surface is connected between the first hole section and the second hole section, and the transition surface is configured to support the fastener, where the axial direction is parallel to the thickness direction of the wall portion. The second through hole takes the form of a stepped hole, and a position of the fastener can be limited by the transition surface supporting the fastener, which facilitates mounting and connection between the fastener and the body portion.

In some embodiments, the second hole section is located between the first hole section and the electrode assembly, and in the axial direction, a surface of the fastener facing the electrode assembly abuts against the transition surface. With the above arrangement, the transition surface can support the surface of the fastener facing the electrode assembly, thereby meeting a positioning requirement of the fastener and facilitating the connection between the fastener and the body portion.

In some embodiments, the first hole section is located between the second hole section and the electrode assembly, a surface of the fastener facing away from the electrode assembly abuts against the transition surface, and in the axial direction, an orthographic projection of each first through hole is located in an orthographic projection of a hole wall of the second hole section. With the above arrangement, the transition surface can support the surface of the fastener facing away from the electrode assembly, thereby meeting the positioning requirement of the fastener. Moreover, the orthographic projection of each first through hole is located in the orthographic projection of the hole wall of the second hole section, so that the transition surface can be prevented from blocking the first through hole, thereby ensuring smooth gas discharge of the battery cell.

In some embodiments, the first hole section is located between the second hole section and the electrode assembly, a surface of the fastener facing away from the electrode assembly abuts against the transition surface, the second through hole further includes a third hole section, the third hole section being formed by extending in the axial direction from the transition surface to a side facing away from the first hole section, and a radial dimension of the third hole section being smaller than the radial dimension of the first hole section but greater than the radial dimension of the second hole section, and in the axial direction, an orthographic projection of each first through hole is located in an orthographic projection of a hole wall of the third hole section. With the above arrangement, the transition surface can support the surface of the fastener facing away from the electrode assembly, thereby meeting a positioning requirement of the fastener. Moreover, with the provision of the third hole section, the transition surface can be prevented from blocking the first through hole when the radial dimension of the second hole section is small, thereby ensuring smooth gas discharge of the battery cell.

In some embodiments, the fastener includes a connecting portion and a mounting portion, the connecting portion being connected to and protruding out of an outer side wall of the mounting portion, the connecting portion being configured to connect the body portion, and the mounting portion being configured to connect the air-permeable member. By adopting the above structural form, the fastener can not only facilitate the mounting of the air-permeable member, but also meet a requirement for connection to the body portion.

In some embodiments, the connecting portion is welded to the body portion, and in the thickness direction, the mounting portion protrudes out of the connecting portion on a side where the electrode assembly is located, and the air-permeable member is connected to an end surface of the mounting portion facing the electrode assembly. The connecting portion being welded to the body portion can guarantee connection strength of the two. Moreover, the mounting portion protrudes out of the connecting portion to the side of the electrode assembly, and the air-permeable member is connected to the end surface of the mounting portion facing the electrode assembly, so that distance between the air-permeable member and a welding position of the connecting portion and the body portion can be increased, thereby preventing heat generated during welding of the connecting portion and the body portion from damaging the air-permeable member or impacting connection strength of the air-permeable member and the mounting portion.

In some embodiments, a gap is formed between the outer side wall of the mounting portion and a hole wall of the second through hole, so that the air-permeable member and the hole wall of the second through hole are spaced apart. With the above arrangement, heat generated during welding of the connecting portion and the body portion is prevented from being transferred from the body portion to the air-permeable member, thereby avoiding damage to the air-permeable member or impact on connection strength of the air-permeable member and the mounting portion.

In some embodiments, a support member is provided in the accommodating cavity, where the support member is configured to support the air-permeable member, and the gas is able to flow through the support member and be discharged from the first through hole. The support member being provided in the accommodating cavity helps the support member further support the air-permeable member, limiting the deformation of the air-permeable member in the thickness direction.

In some embodiments, the support member is connected, through a chemical bond, to a wall surface that forms the accommodating cavity via enclosing. With the above arrangement, connection strength of the support member and the wall surface that forms the accommodating cavity via enclosing can be guaranteed, thereby avoiding impact on the air-permeable member from separation between the support member and the wall surface of the accommodating cavity.

In some embodiments, the air-permeable member is connected to an end surface of the protruding portion through a chemical bond. With the above arrangement, connection strength of the air-permeable member and the protruding portion can be guaranteed. Moreover, impact on performance of the air-permeable member can be reduced, and safety performance of the battery cell can be improved on the basis that a gas discharge requirement is met.

In some embodiments, the housing has a housing body and a cover assembly, where the housing body has an opening, the cover assembly is provided for covering the opening, and one of the housing body and the cover assembly includes the wall portion. With the above arrangement, the fastener may be disposed on the housing body, and certainly may alternatively be disposed on the cover assembly, both of which can meet a gas discharge requirement.

In some embodiments, the cover assembly includes the wall portion, and the battery cell further includes an insulator, where the insulator is configured to separate the cover assembly from the electrode assembly, the insulator is provided with a third through hole, and the third through hole is configured to communicate with the recess. With the above arrangement, the fastener can be disposed on the cover assembly so that the cover assembly has a gas discharge function. Moreover, with the provision of the insulator, a short circuit caused by contact between the electrode assembly and the cover assembly can be avoided, thereby improving safety performance of the battery cell. The correspondingly provided third through hole can facilitate discharge of the gas inside the battery cell.

In some embodiments, the third through hole is provided in plurality, and the plurality of third through holes are spaced apart. The provision of the plurality of third through holes can guarantee a discharge rate of the gas inside the battery cell, thereby improving safety performance of the battery cell.

According to a second aspect, this application provides a cover assembly for a battery cell which includes an electrode assembly, where the cover assembly includes: a cover plate, a wall portion of the cover plate including a body portion and a fastener, where the fastener is provided with a recess communicating with the outside, and the recess is arranged on an inner surface of the fastener facing the electrode assembly and recessed in a direction leaving the electrode assembly; and an air-permeable member covering the recess, where the air-permeable member is configured to allow gas to be discharged to the outside of the battery cell through the recess when a gas pressure inside the battery cell reaches a threshold; wherein a bottom wall of the recess is provided with a protruding portion extending towards the electrode assembly, and the protruding portion is configured to be attached to the air-permeable member, so as to limit deformation of the air-permeable member in a thickness direction of the wall portion.

In the technical solution in this embodiment of this application, a wall portion of a cover plate includes a body portion and a fastener. The fastener is provided with a recess communicating with the outside, where the recess is arranged on an inner surface of the fastener facing an electrode assembly and recessed in a direction leaving the electrode assembly. An air-permeable member covers the recess and allows gas to be discharged to the outside of a housing when a gas pressure inside a battery cell reaches a threshold, meeting the gas discharge requirement. The bottom wall of the recess is provided with a protruding portion extending towards the electrode assembly, and the protruding portion is attached to the air-permeable member, which can support a side of the air-permeable member facing away from the electrode assembly in the thickness direction, so as to limit deformation of the air-permeable member in the thickness direction of the wall portion under an action of gas inside the battery cell, thereby slowing down aging of the air-permeable member.

According to a third aspect, this application provides a battery including the above battery cell.

According to a fourth aspect, this application provides an electric apparatus including the above battery, where the battery is configured to supply electric energy.

According to a fifth aspect, this application provides a method for preparing battery cell, including:

providing a housing body, where the housing body has an opening;

providing an electrode assembly and placing the electrode assembly in the housing body; and providing a cover assembly and covering the opening with the cover assembly to form the battery cell, where the cover assembly includes a cover plate and an air-permeable member, a wall portion of the cover plate including a body portion and a fastener, where the fastener is provided with a recess communicating with the outside, and the recess is arranged on an inner surface of the fastener facing the electrode assembly and recessed in a direction leaving the electrode assembly; and the air-permeable member covers the recess and is configured to allow gas to be discharged to the outside of the battery cell through the recess when a gas pressure inside the battery cell reaches a threshold; where a bottom wall of the recess is provided with a protruding portion extending toward the electrode assembly, and the protruding portion is configured to be attached to the air-permeable member, so as to limit deformation of the air-permeable member in a thickness direction of the wall portion.

According to a sixth aspect, this application provides a device for preparing battery cell, including:

a first assembling apparatus, configured to provide a housing body, where the housing body has an opening;

a second assembling apparatus, configured to provide an electrode assembly and place the electrode assembly in the housing body; and a third assembling apparatus, configured to provide a cover assembly and cover the opening with the cover assembly to form the battery cell, where the cover assembly includes a cover plate and an air-permeable member, a wall portion of the cover plate including a body portion and a fastener, where the fastener is provided with a recess communicating with the outside, and the recess is arranged on an inner surface of the fastener facing the electrode assembly and recessed in a direction leaving the electrode assembly; and the air-permeable member covers the recess and is configured to allow gas to be discharged to the outside of the battery cell through the recess when a gas pressure inside the battery cell reaches a threshold; where a bottom wall of the recess is provided with a protruding portion extending towards the electrode assembly, and the protruding portion is configured to be attached to the air-permeable member, so as to limit deformation of the air-permeable member in a thickness direction of the wall portion.

The foregoing description is merely an overview of the technical solution of this application. For a better understanding of the technical means in this application such that they can be implemented according to the content of this specification, and to make the above and other objectives, features and advantages of this application more obvious and easier to understand, the following describes specific embodiments of this application.

BRIEF DESCRIPTION OF THE DRAWINGS

To describe the technical solutions in the embodiments of this application more clearly, the following briefly describes the accompanying drawings required for describing the embodiments of this application. Apparently, the accompanying drawings in the following descriptions show merely some embodiments of this application, and persons of ordinary skill in the art may still derive other drawings from the accompanying drawings without creative efforts.

Figure 1:
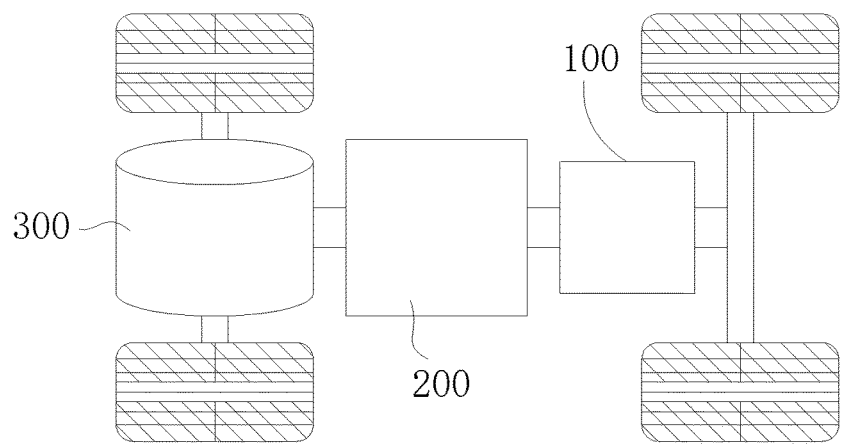
FIG. 1 is a schematic structural diagram of a vehicle according to some embodiments of this application.

REFERENCE SIGNS IN THE EMBODIMENTS 1000. vehicle;
100. battery; 200. controller; 300. motor;
10. box; 11. first portion; 12. second portion;
20. battery cell; 21. cover assembly; 21a. electrode terminal; 21b. cover plate; 22. housing body;
210. wall portion;
211. body portion; 2111. second through hole; 2111a. first hole section; 2111b. second hole section; 2111c. transition surface; 2111d. third hole section;
212. fastener; 212a. connecting portion; 212b. mounting portion; 2121. recess; 2121a. bottom wall; 2121b. inner peripheral wall; 2122. protruding portion; 2122a. first protrusion; 2122b. second protrusion; 2122c. outer peripheral wall; 2123. first through hole; 2124. accommodating cavity; 2125. gap;
23. electrode assembly, 231. tab; 24. insulator; 241. third through hole; 25. air-permeable member; 26. support member;
X. thickness direction; and Y. radial direction.

In the drawings, same reference signs are used for same components. The accompanying drawings are not drawn to scale.

DESCRIPTION OF THE EMBODIMENTS

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "comprise", and "have" and any other variations thereof in this specification, claims, and brief description of drawings of this application are intended to cover non-exclusive inclusions.

In the description of the embodiments of this application, the terms "first", "second" and the like are merely intended to distinguish between different objects, and shall not be understood as any indication or implication of relative importance or any implicit indication of the number, sequence or primary-secondary relationship of the technical features indicated. In the description of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in this specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the apparatuses or components mentioned must have specific orientations or must be constructed or manipulated according to specific orientations, and therefore shall not be construed as any limitations on embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, or may refer to a direct connection, an indirect connection via an intermediate medium, or an interaction between two elements. Persons of ordinary skill in the art can understand specific meanings of these terms in this application as appropriate to specific situations.

Currently, from a perspective of market development, application of electric vehicle batteries is becoming more and more extensive. Electric vehicle batteries are widely used not only in energy storage power supply systems such as hydro, thermal, wind, and solar power plants, but also in electric transportation tools such as electric bicycles, electric motorcycles, electric vehicles, and fields such military equipment and aerospace. With continuous expansion of application fields of electric vehicle batteries, market demands for the electric vehicle batteries are also increasing.

The inventors have noticed that, since a battery undergoes a plurality of charge and discharge cycles during use, side reactions are caused, and gas is continuously generated. As a result, there is a gas pressure inside a battery cell. An increase of the gas pressure results in that gas between electrode plates cannot be discharged in time, which affects intercalation and deintercalation of lithium ions, thus further causes a risk of lithium precipitation. In view of this, a housing of the battery cell is provided with an air-permeable member. On the basis of an explosion-proof function, slow penetrating gas discharge can be realized, thereby reducing the gas pressure inside the battery cell and reducing the risk of lithium precipitation.

The inventors have found that, when the gas pressure inside the battery cell reaches a preset threshold, gas is discharged to the outside of the battery cell through the air-permeable member and acts on the air-permeable member during the discharge process, which makes the air-permeable member prone to deform, resulting in a gap formed between the air-permeable member and the housing, and therefore an electrolyte inside the battery cell is prone to be attached to the air-permeable member. As a result, the air-permeable member swells after long-term use, which accelerates aging of the air-permeable member and causes potential safety hazards to the battery cell.

To alleviate the problem that the air-permeable member deforms under the action of the gas inside the battery cell, the applicant has found through research that support can be provided on a side of the air-permeable member facing away from the electrode assembly to resist force on the air-permeable member in a gas discharge process, thereby reducing deformation of the air-permeable member, and alleviating aging of the air-permeable member.

Based on the above considerations, in order to alleviate the problem that the air-permeable member deforms and ages during use of the battery cell, the inventors have designed a battery cell through in-depth researches. The deformation of the air-permeable member is reduced by providing support for the air-permeable member, thereby guaranteeing safety performance of the battery cell.

The battery cell disclosed in the embodiments of this application may be used without limitation in electric apparatuses such as vehicles, ships, or aircrafts. The battery cell, battery, and the like disclosed in this application may be used to constitute a power supply system of that electric apparatus. This helps reduce deformation of the air-permeable member, alleviating aging of the air-permeable member, improving stability of battery performance, and prolonging service life of the battery.

An embodiment of this application provides an electric apparatus that uses a battery as a power source. The electric apparatus may be, but is not limited to, a mobile phone, a tablet computer, a notebook computer, an electric toy, an electric tool, an electric bicycle, an electric car, a ship, or a spacecraft. The electric toy may be a fixed or mobile electric toy, for example, a game console, an electric toy car, an electric toy ship, and an electric toy airplane. The spacecraft may include an airplane, a rocket, a space shuttle, a spaceship, and the like.

For ease of description, the electric apparatus of an embodiment of the application being a vehicle 1000 is used as an example for description of the following embodiments.

Referring to FIG. 1, FIG. 1 is a schematic structural diagram of a vehicle 1000 according to some embodiments of this application. The vehicle 1000 may be a fossil fuel vehicle, a natural-gas vehicle, or a new energy vehicle, where the new energy vehicle may be a battery electric vehicle, a hybrid electric vehicle, a range-extended vehicle, or the like. The vehicle 1000 is provided with a battery 100 inside, where the battery 100 may be disposed at the bottom, front or rear of the vehicle 1000. The battery 100 may be configured to supply power to the vehicle 1000. For example, the battery 100 may be used as an operational power source for the vehicle 1000. The vehicle 1000 may further include a controller 200 and a motor 300, where the controller 200 is configured to control the battery 100 to supply power to the motor 300, for example, to satisfy power needs of start, navigation, and driving of the vehicle 1000.

In some embodiments of this application, the battery 100 can be used as not only the operational power source for the vehicle 1000 but also a driving power source for the vehicle 1000, replacing or partially replacing fossil fuel or natural gas to provide driving traction for the vehicle 1000.

Figure 2:
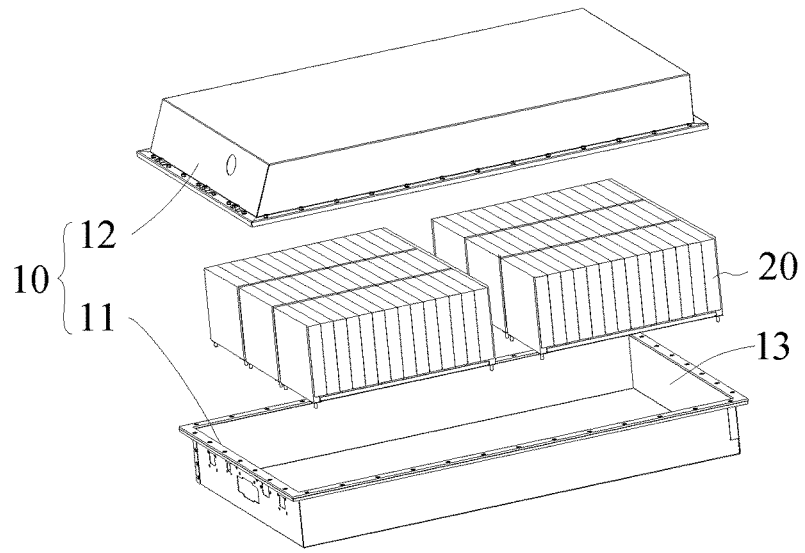
FIG. 2 is an exploded view of a battery according to some embodiments of this application.

Referring to FIG. 2, FIG. 2 is an exploded view of a battery 100 according to some embodiments of this application. The battery 100 includes a box 10 and a battery cell 20, where the battery cell 20 is accommodated in the box 10. The box 10 is configured to provide an accommodating space for the battery cell 20. The box 10 may be a variety of structures. In some embodiments, the box 10 may include a first portion 11 and a second portion 12. The first portion 11 and the second portion 12 fit together so that the first portion 11 and the second portion 12 jointly define a space 13 for accommodating the battery cell 20. The second portion 12 may be a hollow structure with one end open, and the first portion 11 may be a plate structure, where the first portion 11 covers the open side of the second portion 12 so that the first portion 11 and the second portion 12 jointly define the accommodating space. Alternatively, the first portion 11 and the second portion 12 may both be hollow structures with one side open, where the open side of the first portion 11 is engaged with the open side of the second portion 12.

Certainly, the box 10 formed by the first portion 11 and the second portion 12 may have a variety of shapes, for example, cylinder or cuboid.

In the battery 100, the battery cells 20 are present in plurality, and the plurality of battery cells 20 may be connected in series, parallel, or series-parallel, where being connected in series-parallel means a combination of series and parallel connections of the plurality of battery cells 20. The plurality of battery cells 20 may be directly connected in series, parallel, or series-parallel, and then an entirety of the plurality of battery cells 20 is accommodated in the box 10. Certainly, the battery 100 may alternatively be formed by a plurality of battery cells 20 being connected in series, parallel, or series-parallel first to form a battery module, and then a plurality of battery modules being connected in series, parallel, or series-parallel to form an entirety which is accommodated in the box 10. The battery 100 may further include other structures. For example, the battery 100 may further include a busbar configured to implement electrical connection between the plurality of battery cells 20.

Each battery cell 20 may be a secondary battery or a primary battery, and may be a lithium-sulfur battery, a sodium-ion battery, or a magnesium-ion battery, without being limited thereto. The battery cell 20 may be cylindrical, flat, cuboid, or of other shapes.

Figure 3:
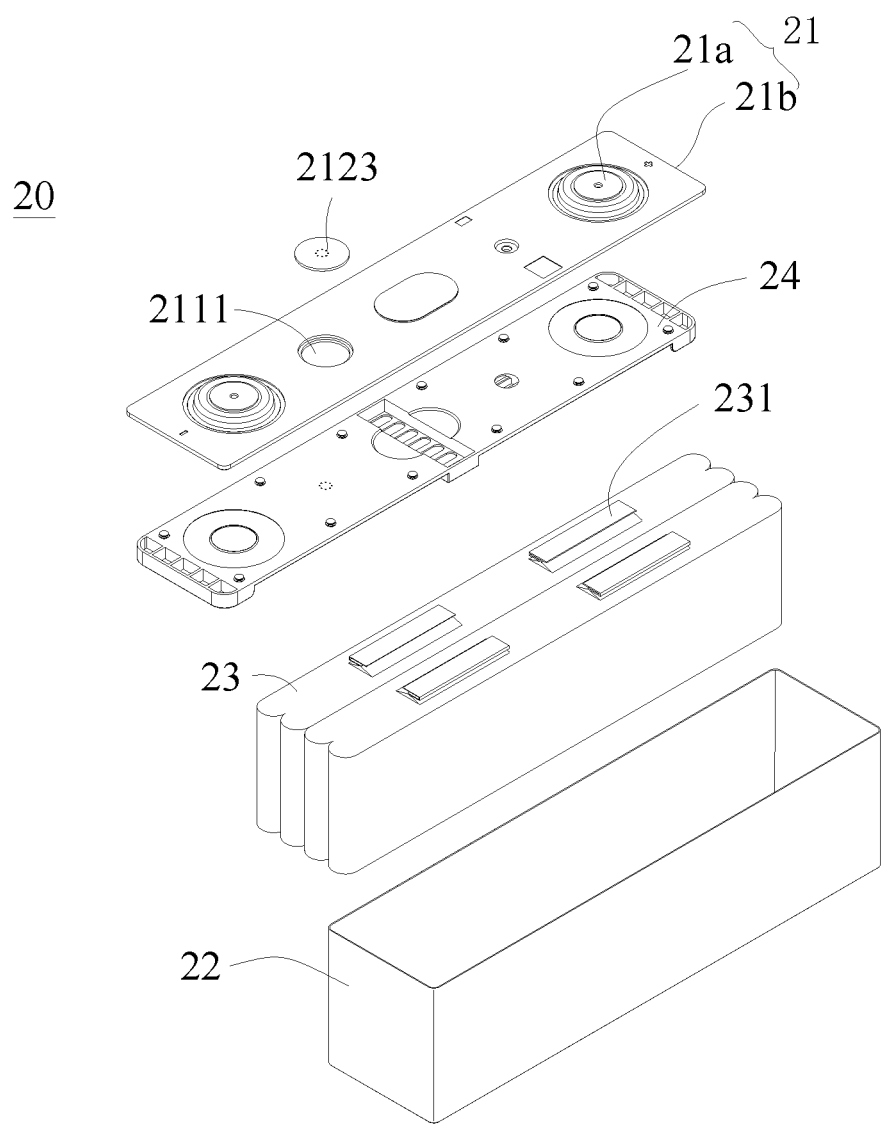
FIG. 3 is a schematic structural exploded view of a battery cell according to some embodiments of this application.

Referring to FIG. 3, FIG. 3 is a schematic structural exploded view of a battery cell 20 according to some embodiments of this application. The battery cell 20 refers to a smallest unit constituting a battery. As shown in FIG. 3, the battery cell 20 includes a cover assembly 21, a housing body 22, an electrode assembly 23, and other functional components.

The cover assembly 21 refers to a component that covers an opening of the housing body 22 to isolate an internal environment of the battery cell 20 from an external environment thereof. A shape of the cover assembly 21 is not limited and may be adapted to a shape of the housing body 22. Optionally, the cover assembly 21 may be made of a material with specified hardness and strength (for example, aluminum alloy), so that the cover assembly 21 is less likely to deform when subjected to compression and collision, enabling the battery cell 20 to have higher structural strength and improved safety performance. The cover assembly 21 may include functional components such as an electrode terminal 21a and a cover plate 21b. The electrode terminal 21a may be configured to be electrically connected to the electrode assembly 23 for outputting or inputting electric energy of the battery cell 20. In some embodiments, the cover assembly 21 may be further provided with a pressure relief mechanism for releasing internal pressure when the internal pressure or a temperature of the battery cell 20 reaches a threshold. The cover assembly 21 may also be made of various materials, such as copper, iron, aluminum, stainless steel, aluminum alloy, and plastic, which are not particularly limited in the embodiments of this application. In some embodiments, an insulator 24 may also be provided on an inner side of the cover assembly 21, and the insulator 24 may be configured to isolate the electrode assembly 23 in the housing body 22 from the cover assembly 21 to reduce a risk of short circuit. For example, the insulator 24 may be made of plastic, a rubber, or the like.

The housing body 22 and the cover assembly 21 jointly form a housing of the battery cell 20. The housing body 22 is an assembly configured to cooperate with the cover assembly 21 to form an internal environment of the battery cell 20, where the formed internal environment can be used to accommodate the electrode assembly 23, an electrolyte, and other components. The housing body 22 and the cover assembly 21 may be independent components, an opening may be formed in the housing body 22, and the cover assembly 21 covers the opening to form the internal environment of the battery cell 20. The cover assembly 21 and the housing body 22 are not limited and may also be integrated. Specifically, the cover assembly 21 and the housing body 22 may form a shared connection surface before other components are disposed in the housing body and then, the housing body 22 is covered with the cover assembly 21 when inside of the housing body 22 needs to be enclosed. The housing body 22 may be of various shapes and sizes, such as a rectangular shape, a cylindrical shape, and a hexagonal prism shape. Specifically, a shape of the housing body 22 may be determined according to a specific shape and size of the electrode assembly 23. The housing body 22 may be made of various materials, such as copper, iron, aluminum, stainless steel, aluminum alloy, and plastic, which are not particularly limited in the embodiments of this application.

The electrode assembly 23 is a component in which electrochemical reactions occur in the battery cell 20. The housing body 22 may include one or more electrode assemblies 23. The electrode assembly 23 is mainly formed by winding or stacking a positive-electrode plate and a negative-electrode plate, and a separator is generally disposed between the positive-electrode plate and the negative-electrode plate. Parts of the positive-electrode plate and the negative-electrode plate with active substances constitute a body portion of the electrode assembly, while parts of the positive-electrode plate and the negative-electrode plate without active substances each constitute a tab 231. A positive tab and a negative tab may both be located at one end of the body portion or be located at two ends of the body portion respectively. In a charge and discharge process of the battery, a positive-electrode active substance and a negative-electrode active substance react with the electrolyte, and the tabs 231 are connected to the electrode terminal 21a to form a current loop.

Figure 4:
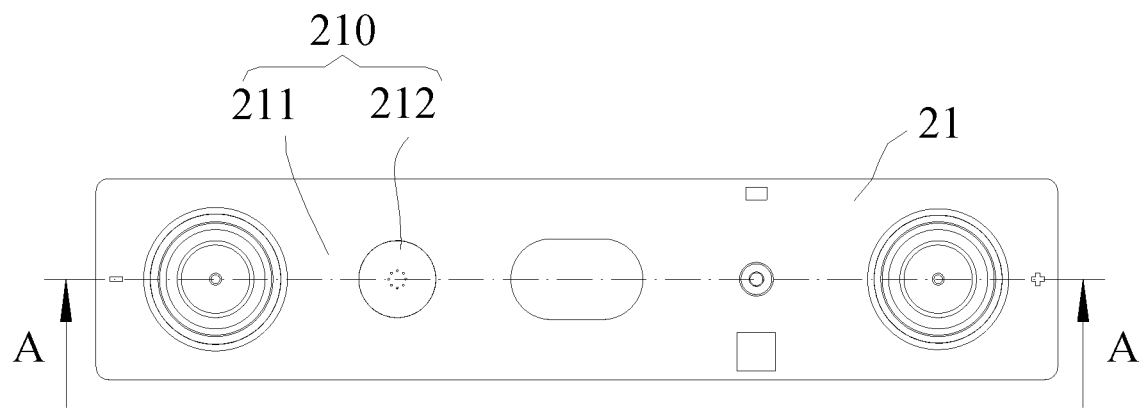
FIG. 4 is a top view of a battery cell according to some embodiments of this application.
Figure 5:
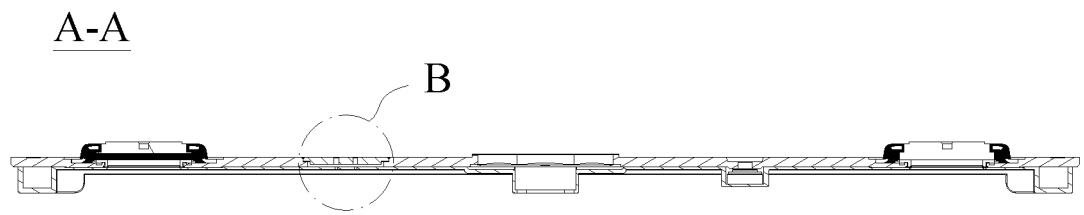
FIG. 5 is a partial cross-sectional view along line A-A in FIG. 4.
Figure 6:
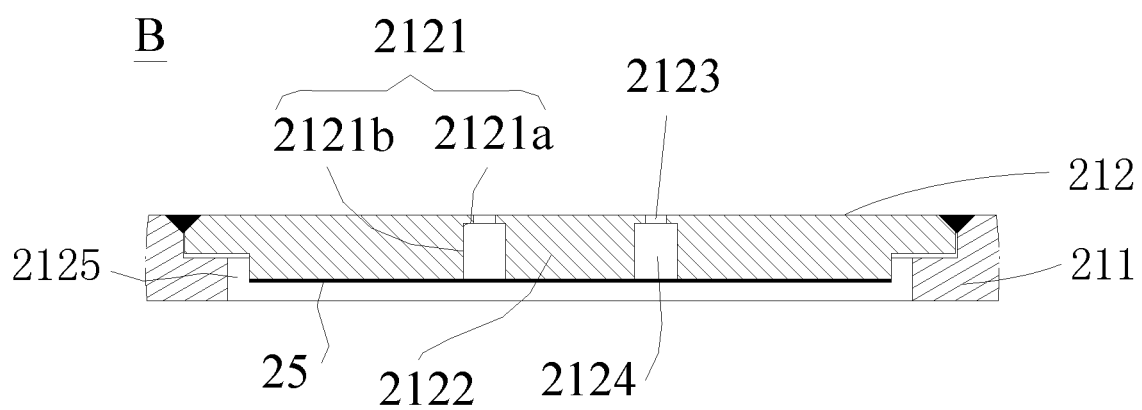
FIG. 6 is an enlarged view of position B in FIG. 5.

According to some embodiments of this application, referring to FIG. 3, and further referring to FIG. 4 to FIG. 6, FIG. 4 is a top view of a battery cell 20 according to some embodiments of this application; FIG. 5 is a partial cross-sectional view along line A-A in FIG. 4; and FIG. 6 is an enlarged view of position B in FIG. 5.

An embodiment of this application provides a battery cell 20, including a housing, an electrode assembly 23, and an air-permeable member 25. The housing is configured to accommodate the electrode assembly 23, where a wall portion 210 of the housing includes a body portion 211 and a fastener 212, the fastener 212 is provided with a recess 2121 communicating with the outside, and the recess 2121 is arranged on an inner surface of the fastener 212 facing the electrode assembly 23 and recessed in a direction leaving the electrode assembly 23. The air-permeable member 25 covers the recess 2121 and is configured to allow gas to be discharged to the outside of the housing through the recess 2121 when a gas pressure inside the housing reaches a threshold. A bottom wall 2121a of the recess 2121 is provided with a protruding portion 2122 extending toward the electrode assembly 23; and the protruding portion 2122 is configured to be attached to the air-permeable member 25, so as to limit deformation of the air-permeable member 25 in a thickness direction X of the wall portion 210.

The housing has a housing body 22 and a cover assembly 21, where the housing body 22 has an opening and the cover assembly 21 is provided for covering the opening. The wall portion 210 of one of the housing body 22 and the cover assembly 21 includes a fastener 212, which may be the wall portion of the housing body 22 including the fastener 212, or the wall portion of the cover assembly 21 including the fastener 212. The cover assembly 21 covers the opening of the housing body 22 to form an internal environment of the battery cell 20 for accommodating the electrode assembly 23, and the wall portion 210 is part of a side wall of the housing for forming the internal environment via enclosing.

The fastener 212 may be in a regular geometric shape, such as a circular shape, an ellipse shape, or a polygonal shape, or certainly may also be in an irregular geometric shape. The fastener 212 includes a portion allowing gas to pass through, so that the gas inside the battery cell 20 passes through and is discharged from the battery cell 20.

The body portion 211 is the part of the wall portion 210 other than the fastener 212. The body portion 211 and the fastener 212 may be of an integral structure or separate structures.

The recess 2121 is arranged on an inner surface of the fastener 212 facing the electrode assembly 23 and recessed in a direction leaving the electrode assembly 23. The recess 2121 is provided with a bottom wall 2121a and an inner peripheral wall 2121b. In the thickness direction X, thickness of the bottom wall 2121a is smaller than thickness of the wall portion 210. The bottom wall 2121a and the inner peripheral wall 2121b form a cavity in an enclosing manner, and the protruding portion 2122 is located in the cavity.

The recess 2121 communicating with the outside means that the recess 2121 communicates with a portion other than the housing of the battery cell 20.

The protruding portion 2122 is a protrusion extending from the bottom wall 2121a of the recess 2121 to the electrode assembly 23, and the protruding portion 2122 protrudes out of the bottom wall 2121a of the recess 2121 in the thickness direction X.

An orthographic projection of the air-permeable member 25 in the thickness direction X covers the recess 2121, so that a fluid needs to pass through the air-permeable member 25 for circulation in the recess 2121. The air-permeable member 25 can allow the gas inside the battery cell 20 to circulate to the outside and can block water vapor and the like outside the battery cell 20 from entering the battery cell 20.

The protruding portion 2122 may be only in contact with but not connected to the air-permeable member 25. Certainly, the protruding portion 2122 may alternatively be in contact with and connected to the air-permeable member 25, for example, connection may be implemented through a chemical bond, via bonding, or the like, and the protruding portion 2122 supports a side of the air-permeable member 25 facing away from the electrode assembly 23.

In the technical solution in this embodiment of this application, a wall portion 210 of the housing may include a body portion 211 and a fastener 212. The fastener 212 is provided with a recess 2121 communicating with the outside, where the recess 2121 is arranged on an inner surface of the fastener 212 facing the electrode assembly 23 and recessed in a direction leaving the electrode assembly 23. An air-permeable member 25 covers the recess 2121 and allows gas to be discharged to the outside of the housing when a gas pressure inside the housing reaches a threshold, meeting the gas discharge requirement. The bottom wall 2121a of the recess 2121 is provided with a protruding portion 2122 extending toward the electrode assembly 23, and the protruding portion 2122 is attached to the air-permeable member 25, which can support a side of the air-permeable member 25 facing away from the electrode assembly 23 in the thickness direction X, so as to limit deformation of the air-permeable member 25 in the thickness direction X of the wall portion 210 under an action of gas inside the battery cell 20, thereby slowing down aging of the air-permeable member 25.

Figure 7:
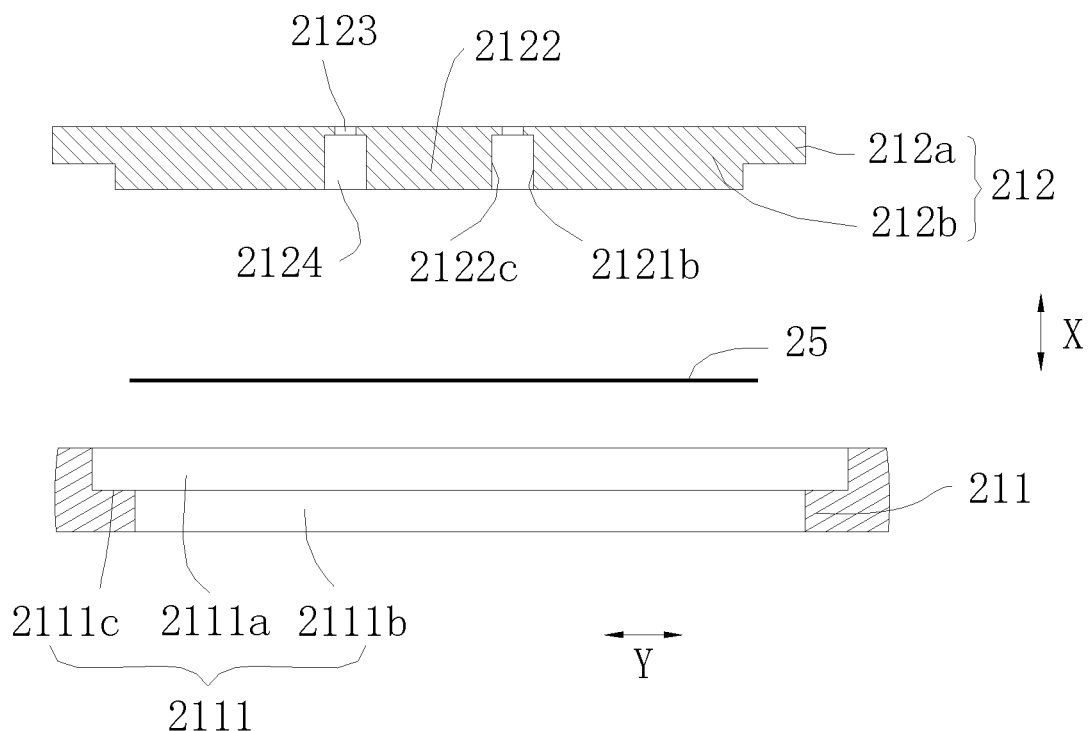
FIG. 7 is an exploded view of a partial structure of a battery cell according to some embodiments of this application.

Referring to FIG. 3 to FIG. 6, and further referring to FIG. 7, FIG. 7 is an exploded view of a partial structure of a battery cell 20 according to some embodiments of this application. According to some embodiments of this application, optionally, an accommodating cavity 2124 communicating with the outside is formed between an outer peripheral wall 2122c of the protruding portion 2122 and an inner peripheral wall 2121b of the recess 2121, the bottom wall 2121a of the recess 2121 is provided with a first through hole 2123, and the first through hole 2123 is configured to allow gas circulation with the inner space of the battery cell 20 through the accommodating cavity 2124.

A wall surface of the protruding portion 2122 facing the inner peripheral wall 2121b of the recess 2121 is the outer peripheral wall 2122c of the protruding portion 2122. Both the outer peripheral wall 2122c of the protruding portion 2122 and the inner peripheral wall 2121b of the recess 2121 may be annular surfaces, circular annular surfaces, polygonal annular surfaces, or surfaces of a same shape. For example, both the outer peripheral wall 2122c of the protruding portion 2122 and the inner peripheral wall 2121b of the recess 2121 may be circular annular. Certainly, the outer peripheral wall 2122c of the protruding portion 2122 and the inner peripheral wall 2121b of the recess 2121 may have different shapes. For example, one of them is a circular annular surface, and the other is a polygonal annular surface. The first through hole 2123 penetrates the bottom wall 2121a of the recess 2121 in the thickness direction X, and the first through hole 2123 communicates with the accommodating cavity 2124. The gas inside the battery cell 20 can pass through the air-permeable member 25 to enter the accommodating cavity 2124, and be discharged to the outside of the battery cell 20 through the first through hole 2123. A shape of the first through hole 2123 is not specifically limited, which may be a circular hole, an oval hole, a polygonal hole, or a special-shaped gas hole, provided that the gas discharge requirement can be met.

The accommodating cavity 2124 communicating with the outside is formed between the outer peripheral wall 2122c of the protruding portion 2122 and the inner peripheral wall 2121b of the recess 2121, and the bottom wall 2121a of the recess 2121 is provided with the first through hole 2123, which can not only ensure that a requirement for discharging the gas inside the battery cell 20 through the accommodating cavity 2124 and the first through hole 2123 is met, but also facilitate arrangement of the protruding portion 2122, so that the protruding portion 2122 can be attached to the air-permeable member 25 so as to limit the deformation of the air-permeable member 25 in the thickness direction X.

According to some embodiments of this application, optionally, the first through hole 2123 is provided in plurality, and the plurality of first through holes 2123 are spaced apart.

The number of the first through holes 2123 may be two, three, or even more. The plurality of first through holes 2123 may be arranged regularly or irregularly. Distances between two adjacent first through holes 2123 may be the same or certainly may also be different. Shapes and sizes of the first through holes 2123 may be the same or different.

The provision of the plurality of first through holes 2123 can guarantee a gas discharge rate, thereby improving safety performance of the battery cell.

Optionally, the plurality of first through holes 2123 are uniformly spaced apart to guarantee uniformity of gas discharge. Optionally, at least some of the plurality of first through holes 2123 may be uniformly spaced apart along a circular track.

Figure 8:
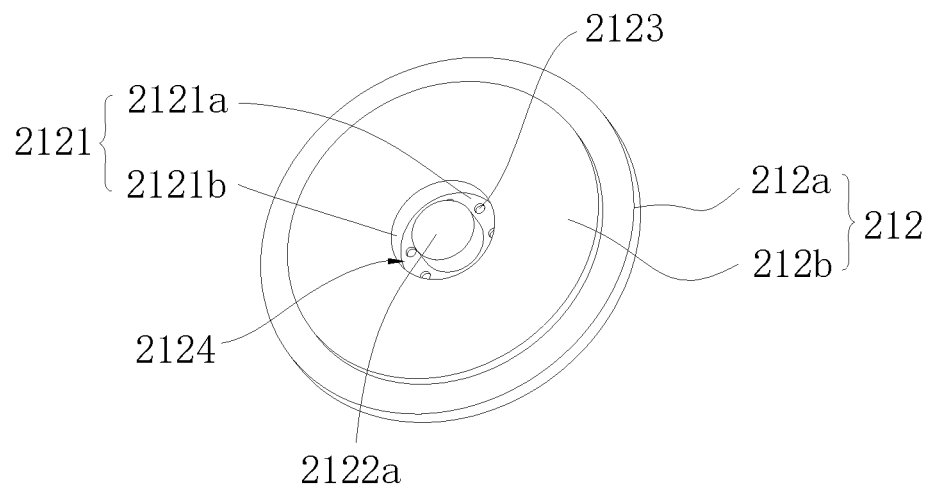
FIG. 8 is a schematic diagram of a partial structure of a battery cell according to some embodiments of this application.

Referring to FIG. 3 to FIG. 7, and further referring to FIG. 8, FIG. 8 is a schematic diagram of a partial structure of a battery cell 20 according to some embodiments of this application. According to some embodiments of this application, optionally, the protruding portion 2122 includes a first protrusion 2122a, and the accommodating cavity 2124 communicating with the outside is formed between an outer peripheral wall of the first protrusion 2122a and the inner peripheral wall 2121b of the recess 2121.

The first protrusion 2122a may be cylinder or certainly may also be of an annular shape. The air-permeable member 25 is attached to a surface of the first protrusion 2122a facing the electrode assembly 23. The gas inside the battery cell 20 enters the accommodating cavity 2124 formed between the first protrusion 2122a and the inner peripheral wall 2121b of the recess 2121 through the air-permeable member 25 and is then discharged to the outside of the battery cell 20 through the first through hole 2123.

With the above arrangement, the protruding portion 2122 can be attached to the air-permeable member 25 via the first protrusion 2122a, and the gas inside the battery cell 20 can be discharged through the accommodating cavity 2124 formed between the first protrusion 2122a and the recess 2121. Therefore, the deformation of the air-permeable member 25 in the thickness direction X can be limited on the basis that the gas discharge requirement is met.

Figure 9:
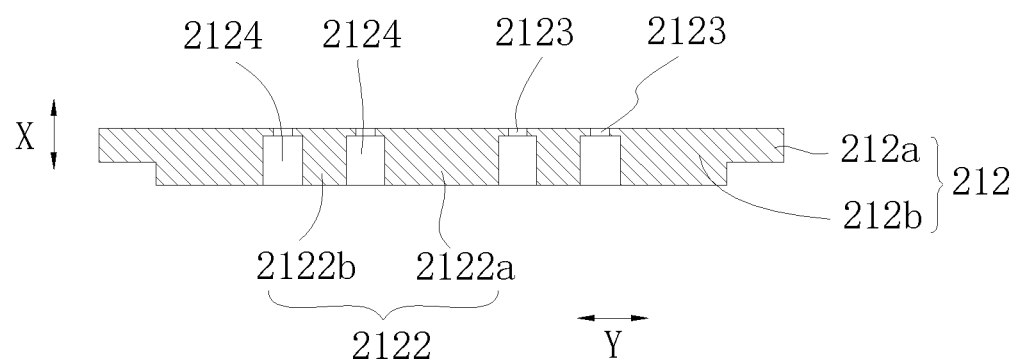
FIG. 9 is a schematic diagram of a partial structure of a battery cell according to some other embodiments of this application.

Referring to FIG. 9, FIG. 9 is a schematic diagram of a partial structure of a battery cell 20 according to some other embodiments of this application. According to some embodiments of this application, optionally, the protruding portion 2122 includes a first protrusion 2122a and a second protrusion 2122b, where the second protrusion 2122b surrounds the first protrusion 2122a and is spaced apart from the first protrusion 2122a, the accommodating cavity 2124 communicating with the outside is formed between an outer peripheral wall of the first protrusion 2122a and an inner peripheral wall of the second protrusion 2122b, and the accommodating cavity 2124 communicating with the outside is formed between an outer peripheral wall of the second protrusion 2122b and the inner peripheral wall 2121b of the recess 2121.

The first protrusion 2122a may be cylinder or may also be of an annular shape. The second protrusion 2122b may be of an annular shape. The air-permeable member 25 is attached to surfaces of the first protrusion 2122a and the second protrusion 2122b facing the electrode assembly 23. The bottom wall 2121a of the recess 2121 is provided with first through holes 2123 both in a region between the outer peripheral wall of the first protrusion 2122a and the inner peripheral wall of the second protrusion 2122b and in a region between the outer peripheral wall of the second protrusion 2122b and the inner peripheral wall 2121b of the recess 2121.

With the above arrangement, the protruding portion 2122 can be attached to the air-permeable member 25 via the first protrusion 2122a and the second protrusion 2122b at the same time, thereby effectively limiting the deformation of the air-permeable member 25 in the thickness direction X. Moreover, the gas inside the battery cell 20 can be discharged through the accommodating cavity 2124 between the first protrusion 2122a and the second protrusion 2122b and the accommodating cavity 2124 between the second protrusion 2122b and the recess 2121, thereby meeting the gas discharge requirement of the battery cell 20 and improving safety performance of the battery cell 20.

Optionally, each accommodating cavity 2124 is an annular cavity. Multiple first through holes 2123 communicate with each accommodating cavity 2124 and are spaced apart along a circular track of the annular cavity, so as to facilitate gas discharge.

Figure 10:
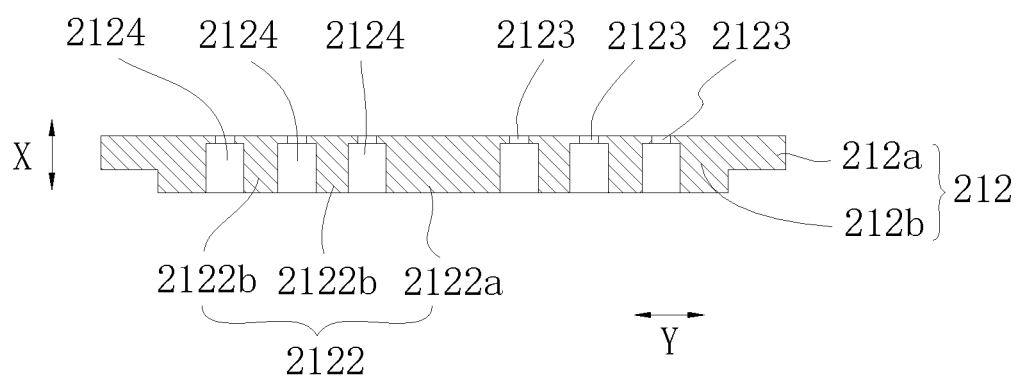
FIG. 10 is a schematic diagram of a partial structure of a battery cell according to still some other embodiments of this application.

Referring to FIG. 10, FIG. 10 is a schematic diagram of a partial structure of a battery cell 20 according to still some other embodiments of this application. According to some embodiments of this application, optionally, two or more second protrusions 2122b are provided, the two or more second protrusions 2122b are coaxially spaced apart, and the accommodating cavity 2124 communicating with the outside is formed between two adjacent second protrusions 2122b.

The number of the second protrusions 2122b may be two, three, or even more, the second protrusions 2122b are of an annular shape, and the two or more second protrusions 2122b are spaced apart in a direction perpendicular to the thickness direction X. An axial direction of the second protrusions 2122b is parallel to the thickness direction X. The bottom wall 2121a of the recess 2121 is provided with a first through hole 2123 in a region between two adjacent second protrusions 2122b.

With the above arrangement, each second protrusion 2122b can be attached to the air-permeable member 25, so that attachment area between the protruding portion 2122 and the air-permeable member 25 is increased, and a deformation probability of the air-permeable member 25 in the thickness direction X is reduced. In addition, the accommodating cavities 2124 communicating with the outside being formed between the first protrusion 2122a and the second protrusion 2122b, between adjacent second protrusions 2122b, and between the second protrusion 2122b and the recess 2121 can increase the gas discharge rate, thereby improving safety performance of the battery cell 20.

Still referring to FIG. 3 to FIG. 10, according to some embodiments of this application, optionally, the fastener 212 includes a second through hole 2111, the second through hole 2111 is configured to accommodate the fastener 212, and the fastener 212 is configured to connect the air-permeable member 25 and the body portion 211.

The fastener 212 and the body portion 211 may be disposed separately, or the fastener 212 may be entirely located in the second through hole 2111 of the body portion 211 or may also at least partially protrude out of the body portion 211 in the thickness direction X. The fastener 212 and the body portion 211 may be connected in a fixed manner or may also be connected in a detachable manner. The air-permeable member 25 is connected to the body portion 211 via the fastener 212.

With the above arrangement, the fastener 212 and the body portion 211 can be disposed separately, thereby facilitating formation of structures such as the recess 2121 and the protruding portion 2122 of the fastener 212.

According to some embodiments of this application, optionally, the second through hole 2111 includes a first hole section 2111a and a second hole section 2111b in an axial direction of the second through hole, a radial dimension of the first hole section 2111a is greater than a radial dimension of the second hole section 2111b, a transition surface 2111c is connected between the first hole section 2111a and the second hole section 2111*b*, and the transition surface 2111*c* is configured to support the fastener 212, where the axial direction is parallel to the thickness direction X of the wall portion 210.

The entire second through hole 2111 may be a stepped hole. A dimension ratio of the first hole section 2111*a* to the second hole section 2111*b* in the axial direction is not specifically limited. Orthographic projections of the first hole section 2111*a* and the second hole section 2111*b* in the axial direction may have a same shape, for example, both be circular or polygonal. Certainly, in some examples, the orthographic projections of the first hole section 2111*a* and the second hole section 2111*b* in the axial direction may have different shapes, for example, the orthographic projection of one of them may be circular, and the orthographic projection of the other may be polygonal. The entire second through hole 2111 communicates with the inside of the battery cell 20 in the thickness direction X.

When the orthographic projections of the first hole section 2111*a* and the second hole section 2111*b* in the axial direction are both circular, a radial direction Y is an extension direction of a diameter of the circular orthographic projection.

When the orthographic projection of at least one of the first hole section 2111*a* and the second hole section 2111*b* in the axial direction is non-circular, for example, when the orthographic projection is polygonal, the radial direction Y is a direction perpendicular to the axial direction. For example, the radial direction Y may be an extension direction of a connecting line between a center of the orthographic projection of the second through hole 2111 in the thickness direction X and a point on an outer contour line of the orthographic projection.

The second through hole 2111 takes the form of a stepped hole, and a position of the fastener 212 can be limited by the transition surface 2111*c* supporting the fastener 212, which facilitates mounting and connection between the fastener 212 and the body portion 211.

According to some embodiments of this application, optionally, the second hole section 2111*b* is located between the first hole section 2111*a* and the electrode assembly 23, and in the axial direction, a surface of the fastener 212 facing the electrode assembly 23 abuts against the transition surface 2111*c*.

A surface of the fastener 212 facing away from the electrode assembly 23 may partially protrude out of the first hole section 2111*a*, or certainly may also be located in the first hole section 2111*a*. When that surface is located in the first hole section 2111*a*, space occupied by the battery cell 20 can be reduced, thereby increasing energy density of the battery cell 20.

The surface of the fastener 212 facing the electrode assembly 23 may be only in contact with the transition surface 2111*c*, and the fastener 212 is supported by the transition surface 2111*c* in a direction leaving the electrode assembly 23. Certainly, the surface of the fastener 212 facing the electrode assembly 23 may be in contact with and connected to the transition surface 2111*c*, provided that a requirement for connection between the fastener 212 and the body portion 211 is met.

With the above arrangement, the transition surface 2111*c* can support the surface of the fastener 212 facing the electrode assembly 23, thereby meeting a positioning requirement of the fastener 212 and facilitating the connection between the fastener 212 and the body portion 211.

Figure 11:
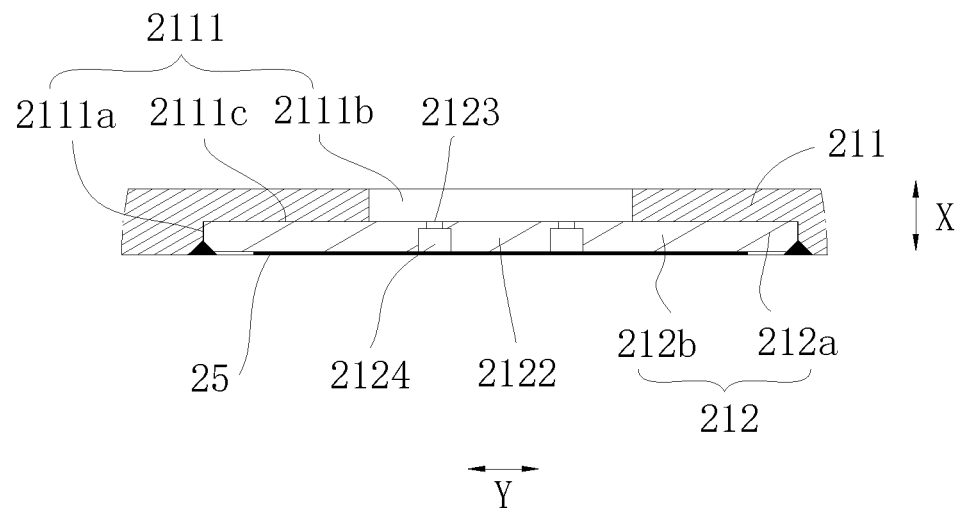
FIG. 11 is a partial cross-sectional view of a battery cell according to yet some other embodiments of this application.

Referring to FIG. 11, FIG. 11 is a partial cross-sectional view of a battery cell 20 according to yet some other embodiments of this application. According to some embodiments of this application, optionally, the first hole section 2111*a* is located between the second hole section 2111*b* and the electrode assembly 23, a surface of the fastener 212 facing away from the electrode assembly 23 abuts against the transition surface 2111*c*, and in the axial direction, an orthographic projection of each first through hole 2123 is located in an orthographic projection of a hole wall of the second hole section 2111*b*.

A surface of the fastener 212 facing the electrode assembly 23 may partially protrude out of the first hole section 2111*a*, or certainly may also be located in the first hole section 2111*a*.

The surface of the fastener 212 facing away from the electrode assembly 23 is in contact with the transition surface 2111*c*, and the fastener 212 is supported by the transition surface 2111*c* in a direction leaving the electrode assembly 23. Certainly, the surface of the fastener 212 facing away from the electrode assembly 23 may be only in contact with and connected to the transition surface 2111*c*, provided that a requirement for connection between the fastener 212 and the body portion 211 is met.

The orthographic projection of the hole wall of the second hole section 2111*b* in the axial direction is annular, and the orthographic projection of each first through hole 2123 is located in the annular orthographic projection of the second hole section 2111*b*.

With the above arrangement, the transition surface 2111*c* can support the surface of the fastener 212 facing away from the electrode assembly 23, thereby meeting the positioning requirement of the fastener 212. Moreover, the orthographic projection of each first through hole 2123 is located inside the orthographic projection of the hole wall of the second hole section 2111*b*, so that the transition surface 2111*c* can be prevented from blocking the first through hole 2123, thereby ensuring smooth gas discharge of the battery cell 20.

Figure 12:
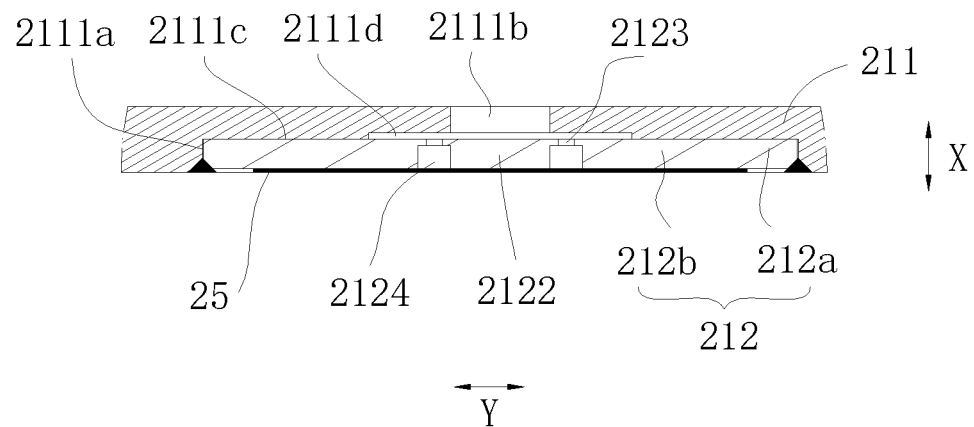
FIG. 12 is a partial cross-sectional view of a battery cell according to yet some other embodiments of this application.

Referring to FIG. 12, FIG. 12 is a partial cross-sectional view of a battery cell 20 according to yet some other embodiments of this application. According to some embodiments of this application, optionally, the first hole section 2111*a* is located between the second hole section 2111*b* and the electrode assembly 23, a surface of the fastener 212 facing away from the electrode assembly 23 abuts against the transition surface 2111*c*, the second through hole 2111 further includes a third hole section 2111*d*, the third hole section 2111*d* being formed by extending in the axial direction from the transition surface 2111*c* to a side facing away from the first hole section 2111*a*, and a radial dimension of the third hole section 2111*d* being smaller than the radial dimension of the first hole section 2111*a* but greater than the radial dimension of the second hole section 2111*b*. In the axial direction, an orthographic projection of each first through hole 2123 is located in an orthographic projection of the hole wall of the third hole section 2111*d*.

With the above arrangement, the transition surface 2111*c* can support the surface of the fastener 212 facing away from the electrode assembly 23, thereby meeting a positioning requirement of the fastener 212. Moreover, with the provision of the third hole section 2111*d*, the transition surface 2111*c* can be prevented from blocking the first through hole 2123 when the radial dimension of the second hole section 2111*b* is small, thereby ensuring smooth gas discharge of the battery cell 20.

Still referring to FIG. 6 to FIG. 12, according to some embodiments of this application, optionally, the fastener 212 includes a connecting portion 212*a* and a mounting portion 212b, where the connecting portion 212a is connected to and protrudes out of an outer side wall of the mounting portion 212b, the connecting portion 212a is configured to connect the body portion 211, and the mounting portion 212b is configured to connect the air-permeable member 25.

The mounting portion 212b may be cylinder, and in the thickness direction X, length of the mounting portion 212b and that of the connecting portion 212a may be the same or different. Ends of the mounting portion 212b and the connecting portion 212a in the thickness direction X may be flush with each other.

By adopting the above structural form, the fastener 212 can not only facilitate the mounting of the air-permeable member 25, but also meet a requirement for connection to the body portion 211.

According to some embodiments of this application, optionally, the connecting portion 212a is welded to the body portion 211, and in the thickness direction X, the mounting portion 212b protrudes out of the connecting portion 212a on a side where the electrode assembly 23 is located, and the air-permeable member 25 is connected to an end surface of the mounting portion 212b facing the electrode assembly 23.

A welding position of the connecting portion 212a and the body portion 211 may be specified as required. In some optional examples, an end of the connecting portion 212a in the thickness direction X may be welded to the body portion 211.

The length of the mounting portion 212b in the thickness direction X is greater than the length of the connecting portion 212a in the thickness direction X, and the air-permeable member 25 is connected to the end surface of the mounting portion 212b facing the electrode assembly 23.

The connecting portion 212a being welded to the body portion 211 can guarantee connection strength of the two. Moreover, the mounting portion 212b protrudes out of the connecting portion 212a to the side of the electrode assembly 23, and the air-permeable member 25 is connected to the end surface of the mounting portion 212b facing the electrode assembly 23, so that distance between the air-permeable member 25 and a welding position of the connecting portion 212a and the body portion 211 can be increased, thereby preventing heat generated during welding of the connecting portion 212a and the body portion 211 from damaging the air-permeable member 25 or impacting connection strength of the air-permeable member 25 and the mounting portion 212b.

According to some embodiments of this application, optionally, a gap 2125 is formed between the outer side wall of the mounting portion 212b and a hole wall of the second through hole 2111, so that the air-permeable member 25 and the hole wall of the second through hole 2111 are spaced apart.

In the radial direction Y of the second through hole 2111, a gap 2125 is formed between the outer side wall of the mounting portion 212b and the hole wall of the second through hole 2111, and the air-permeable member 25 is attached to the mounting portion 212b with an edge not exceeding the mounting portion 212b, so that a gap is also formed between the air-permeable member 25 and the hole wall of the second through hole 2111.

With the above arrangement, heat generated during welding of the connecting portion 212a and the body portion 211 is prevented from being transferred from the body portion 211 to the air-permeable member 25, thereby avoiding damage to the air-permeable member 25 or impact on connection strength of the air-permeable member 25 and the mounting portion 212b.

Figure 13:
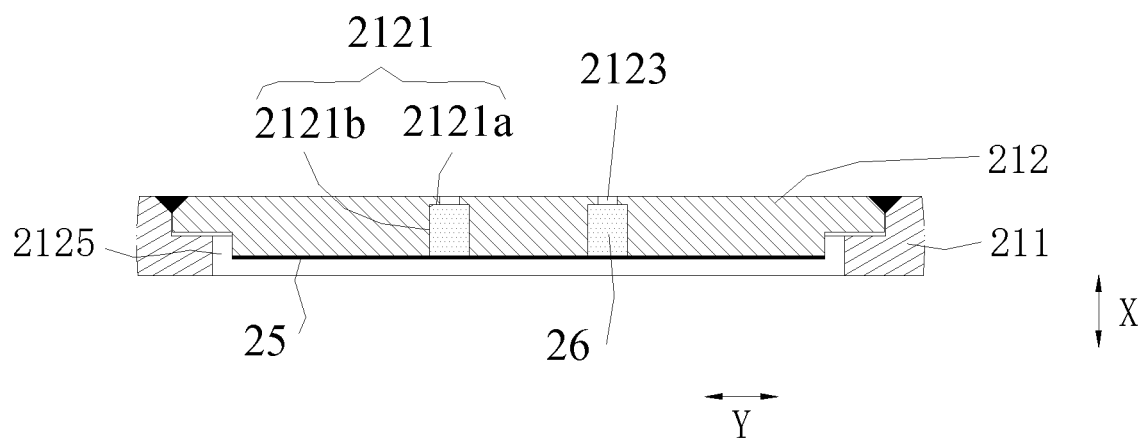
FIG. 13 is a partial cross-sectional view of a battery cell according to yet some other embodiments of this application.
Figure 14:
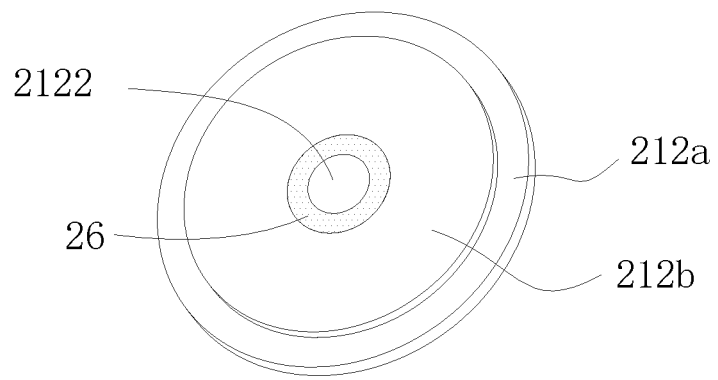
FIG. 14 is a schematic diagram of a partial structure of a battery cell according to yet some other embodiments of this application.

Referring to FIG. 13 and FIG. 14, FIG. 13 is a partial cross-sectional view of a battery cell 20 according to yet some other embodiments of this application, and FIG. 14 is a schematic diagram of a partial structure of a battery cell 20 according to some embodiments of this application. According to some embodiments of this application, optionally, a support member 26 is provided in the accommodating cavity 2124, where the support member 26 is configured to support the air-permeable member 25, and the gas can flow through the support member 26 and be discharged from the first through hole 2123.

The support member 26 has a specified degree of hardness and can support the air-permeable member 25. In addition, the support member 26 has air permeability, so that gas entering the accommodating cavity 2124 in the battery cell 20 is not blocked by the support member 26, and can be smoothly discharged to the outside of the battery cell 20.

The support member 26 being provided in the accommodating cavity 2124 helps the support member 26 further support the air-permeable member 25, limiting the deformation of the air-permeable member 25 in the thickness direction X.

According to some embodiments of this application, optionally, the support member 26 is connected, through a chemical bond, to a wall surface that forms the accommodating cavity 2124 via enclosing.

With the above arrangement, connection strength of the support member 26 and the wall surface that forms the accommodating cavity 2124 via enclosing can be guaranteed, thereby avoiding impact on the air-permeable member 25 from separation between the support member 26 and the wall surface of the accommodating cavity 2124.

According to some embodiments of this application, optionally, the air-permeable member 25 is connected to an end surface of the protruding portion 2122 through a chemical bond.

With the above arrangement, connection strength of the air-permeable member 25 and the protruding portion 2122 can be guaranteed. Moreover, impact on performance of the air-permeable member 25 can be reduced, and safety performance of the battery cell 20 can be improved on the basis that a gas discharge requirement is met.

According to some embodiments of this application, optionally, one of the housing body 22 and the cover assembly 21 includes the wall portion 210. The housing body 22 may include the wall portion 210, or alternatively, the cover assembly 21 may include the wall portion 210. When the cover assembly 21 includes the wall portion 210, the cover assembly 21 may be a part of the battery cell 20, or may be produced, sold, and so on as an independent component.

Figure 15:
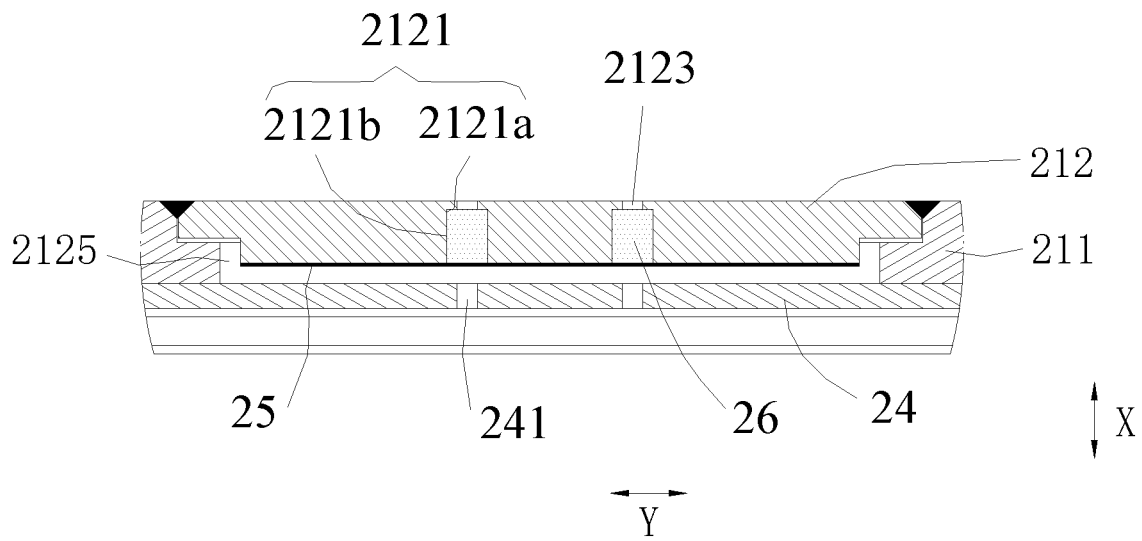
FIG. 15 is a partial cross-sectional view of a battery cell according to yet some other embodiments of this application.

Referring to FIG. 3 and FIG. 15, FIG. 15 is a partial cross-sectional view of a battery cell 20 according to yet some other embodiments of this application. According to some embodiments of this application, optionally, the cover assembly 21 includes the wall portion 210, and the battery cell 20 further includes an insulator 24, where the insulator 24 is configured to separate the cover assembly 21 from the electrode assembly 23, the insulator 24 is provided with a third through hole 241, and the third through hole 241 is configured to communicate with the recess 2121.

The fastener 212 is provided on the wall portion 210 included in the cover assembly 21. The battery cell 20 is located between the cover assembly 21 and the electrode assembly 23. The number of the third through holes 241 in the insulator 24 is not specifically limited, which may be one or more, and may be the same as or different from the number of the first through holes 2123. In the thickness direction X, an orthographic projection of the third through hole 241 and an orthographic projection of the first through hole 2123 may overlap, partially overlap, or be staggered.

With the above arrangement, the fastener 212 can be disposed on the cover assembly 21, so that the cover assembly 21 has a gas discharge function. Moreover, with the provision of the insulator 24, a short circuit caused by contact between the electrode assembly 23 and the cover assembly 21 can be avoided, thereby improving safety performance of the battery cell 20. The correspondingly provided third through hole 241 can facilitate discharge of the gas inside the battery cell 20.

According to some embodiments of this application, optionally, the third through hole 241 is provided in plurality, and the plurality of third through holes 241 are spaced apart.

The number of the third through holes 241 may be two, three, or even more. The plurality of third through holes 241 may be arranged regularly or irregularly. Distances between two adjacent third through holes 241 may be the same or certainly may also be different. Shapes and sizes of the third through holes 241 may be the same or different.

The provision of the plurality of third through holes 241 can guarantee a discharge rate of the gas inside the battery cell 20, thereby improving safety performance of the battery cell 20.

Figure 16:
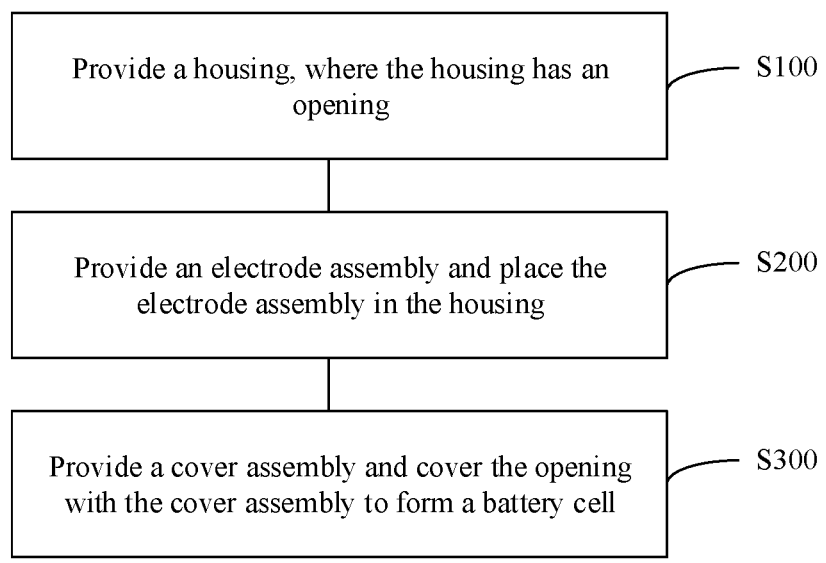
FIG. 16 is a flowchart of a method for preparing battery cell according to some embodiments of this application.

Referring to FIG. 3 to FIG. 15, and further referring to FIG. 16, FIG. 16 is a flowchart of a method for preparing battery cell 20 according to some embodiments of this application.

According to another aspect, an embodiment of this application provides a method for preparing battery cell 20, including the following steps.

S100. Provide a housing body 22, where the housing body 22 has an opening.

S200. Provide an electrode assembly 23 and place the electrode assembly 23 in the housing body 22.

S300. Provide a cover assembly 21 and cover the opening with the cover assembly 21 to form the battery cell 20, where the cover assembly 21 includes a cover plate 21b and an air-permeable member 25, a wall portion 210 of the cover plate 21b including a body portion 211 and a fastener 212, where the fastener 212 is provided with a recess 2121 communicating with the outside, and the recess 2121 is arranged on an inner surface of the fastener 212 facing the electrode assembly 23 and recessed in a direction leaving the electrode assembly 23; and the air-permeable member 25 covers the recess 2121 and is configured to allow gas to be discharged to the outside of the battery cell 20 through the recess 2121 when a gas pressure inside the battery cell 20 reaches a threshold; where a bottom wall 2121a of the recess 2121 is provided with a protruding portion 2122 extending toward the electrode assembly 23, and the protruding portion 2122 is configured to be attached to the air-permeable member 25, so as to limit deformation of the air-permeable member 25 in a thickness direction X of the wall portion 210.

The method for preparing battery cell 20 provided in the embodiments of this application can be used for preparing the battery cell 20 provided in the foregoing embodiments. In the prepared battery cell 20, the protruding portion 2122 being attached to the air-permeable member 25 can support a side of the air-permeable member 25 facing away from the electrode assembly 23 in the thickness direction X, so as to limit deformation of the air-permeable member 25 in the thickness direction X of the wall portion 210 under an action of gas inside the battery cell 20, thereby slowing down aging of the air-permeable member 25 and ensuring better safety performance.

According to still another aspect, an embodiment of this application provides a device for preparing battery cell 20, including:

a first assembling apparatus, configured to provide a housing body 22, where the housing body 22 has an opening;

a second assembling apparatus, configured to provide an electrode assembly 23 and place the electrode assembly 23 in the housing body 22; and a third assembling apparatus, configured to provide a cover assembly 21 and cover the opening with the cover assembly 21 to form the battery cell 20, where the cover assembly 21 includes a cover plate 21b and an air-permeable member 25, a wall portion 210 of the cover plate 21b including a body portion 211 and a fastener 212, where the fastener 212 is provided with a recess 2121 communicating with the outside, and the recess 2121 is arranged on an inner surface of the fastener 212 facing the electrode assembly 23 and recessed in a direction leaving the electrode assembly 23; and the air-permeable member 25 covers the recess 2121 and is configured to allow gas to be discharged to the outside of the battery cell 20 through the recess 2121 when a gas pressure inside the battery cell 20 reaches a threshold; where a bottom wall 2121a of the recess 2121 is provided with a protruding portion 2122 extending toward the electrode assembly 23, and the protruding portion 2122 is configured to be attached to the air-permeable member 25, so as to limit deformation of the air-permeable member 25 in a thickness direction X of the wall portion 210.

The method for preparing battery cell 20 provided in the embodiments of this application can be used for preparing the battery cell 20 provided in the foregoing embodiments. In the prepared battery cell 20, the protruding portion 2122 being attached to the air-permeable member 25 can support a side of the air-permeable member 25 facing away from the electrode assembly 23 in the thickness direction X, so as to limit deformation of the air-permeable member 25 in the thickness direction X of the wall portion 210 under an action of gas inside the battery cell 20, thereby slowing down aging of the air-permeable member 25 and ensuring better safety performance.

Although this application has been described with reference to the preferred embodiments, various modifications to this application and replacements with equivalents of the components herein can be made without departing from the scope of this application. In particular, as long as there is no structural conflict, the various technical features mentioned in the embodiments can be combined in any manners. This application is not limited to the specific embodiments disclosed in this specification, but includes all technical solutions falling within the scope of the claims.

The invention claimed is:

1. A battery cell, comprising:
   an electrode assembly;
   a housing, configured to accommodate the electrode assembly, wherein a wall portion of the housing comprises a body portion and a fastener, the fastener is provided with a recess communicating with an outside, and the recess is arranged on an inner surface of the fastener facing the electrode assembly and recessed in a direction leaving the electrode assembly; and an air-permeable member covering the recess, wherein the air-permeable member is configured to allow gas to be discharged to the outside of the housing through the recess when a gas pressure inside the housing reaches a threshold;

wherein a bottom wall of the recess is provided with a protruding portion extending toward the electrode assembly, and the protruding portion is configured to be attached to the air-permeable member, so as to limit deformation of the air-permeable member in a thickness direction of the wall portion, an accommodating cavity communicating with the outside is formed between an outer peripheral wall of the protruding portion and an inner peripheral wall of the recess, the bottom wall of the recess is provided with a first through hole, and the first through hole is configured to allow gas circulation with an inner space of the battery cell through the accommodating cavity.

2. The battery cell according to claim 1, wherein the protruding portion comprises a first protrusion, and the accommodating cavity communicating with the outside is formed between an outer peripheral wall of the first protrusion and the inner peripheral wall of the recess.

3. The battery cell according to claim 1, wherein the protruding portion comprises a first protrusion and a second protrusion, the second protrusion surrounds the first protrusion and is spaced apart from the first protrusion, the accommodating cavity communicating with the outside is formed between an outer peripheral wall of the first protrusion and an inner peripheral wall of the second protrusion, and the accommodating cavity communicating with the outside is formed between an outer peripheral wall of the second protrusion and the inner peripheral wall of the recess.

4. The battery cell according to claim 3, wherein two or more second protrusions are provided, the two or more second protrusions are coaxially spaced apart, and the accommodating cavity communicating with the outside is formed between two adjacent second protrusions.

5. The battery cell according to claim 1, wherein the body portion comprises a second through hole, the second through hole is configured to accommodate the fastener, and the fastener is configured to connect the air-permeable member and the body portion.

6. The battery cell according to claim 5, wherein the second through hole comprises a first hole section and a second hole section in an axial direction of the second through hole, a radial dimension of the first hole section is greater than a radial dimension of the second hole section, a transition surface is connected between the first hole section and the second hole section, and the transition surface is configured to support the fastener, wherein the axial direction is parallel to the thickness direction of the wall portion.

7. The battery cell according to claim 6, wherein the second hole section is located between the first hole section and the electrode assembly, and in the axial direction, a surface of the fastener facing the electrode assembly abuts against the transition surface.

8. The battery cell according to claim 6, wherein the first hole section is located between the second hole section and the electrode assembly, a surface of the fastener facing away from the electrode assembly abuts against the transition surface, and in the axial direction, an orthographic projection of each first through hole is located in an orthographic projection of a hole wall of the second hole section.

9. The battery cell according to claim 6, wherein the first hole section is located between the second hole section and the electrode assembly, a surface of the fastener facing away from the electrode assembly abuts against the transition surface, the second through hole further comprises a third hole section, the third hole section being formed by extending in the axial direction from the transition surface to a side facing away from the first hole section, and a radial dimension of the third hole section being smaller than the radial dimension of the first hole section but greater than the radial dimension of the second hole section, and in the axial direction, an orthographic projection of each first through hole is located in an orthographic projection of a hole wall of the third hole section.

10. The battery cell according to claim 1, wherein the fastener comprises a connecting portion and a mounting portion, the connecting portion being connected to and protruding out of an outer side wall of the mounting portion, the connecting portion being configured to connect the body portion, and the mounting portion being configured to connect the air-permeable member.

11. The battery cell according to claim 1, wherein the connecting portion is welded to the body portion, and in the thickness direction, the mounting portion protrudes out of the connecting portion on a side where the electrode assembly is located, and the air-permeable member is connected to an end surface of the mounting portion facing the electrode assembly.

12. The battery cell according to claim 11, wherein in a radial direction of the second through hole, a gap is formed between the outer side wall of the mounting portion and a hole wall of the second through hole, so that the air-permeable member and the hole wall of the second through hole are spaced apart, the air-permeable member is attached to the mounting portion with an edge thereof not exceeding the mounting portion, and a gap is also formed between the air-permeable member and the hole wall of the second through hole.

13. The battery cell according to claim 1, wherein a support member is provided in the accommodating cavity, the support member is configured to support the air-permeable member, and the gas is able to flow through the support member and be discharged from the first through hole, wherein the support member is connected, through a chemical bond, to a wall surface that forms the accommodating cavity via enclosing.

14. The battery cell according to claim 1, wherein the air-permeable member is connected to an end surface of the protruding portion through a chemical bond.

15. The battery cell according to claim 1, wherein the housing has a housing body and a cover assembly, the housing body has an opening, the cover assembly is provided for covering the opening, and one of the housing body and the cover assembly comprises the wall portion.

16. The battery cell according to claim 15, wherein the cover assembly comprises the wall portion, and the battery cell further comprises an insulator, the insulator being configured to separate the cover assembly from the electrode assembly, the insulator being provided with a third through hole, and the third through hole being configured to communicate with the recess, wherein the third through hole is provided in plurality, and the plurality of third through holes are spaced apart.

17. A battery, comprising the battery cell according to claim 1.

18. An electric apparatus, comprising the battery according to claim 7, wherein the battery is configured to supply electric energy.

19. A cover assembly for a battery cell which comprises an electrode assembly, wherein the cover assembly comprises:
- a cover plate, a wall portion of the cover plate comprising a body portion and a fastener, wherein
- the fastener is provided with a recess communicating with an outside, and the recess is arranged on an inner surface of the fastener facing the electrode assembly and recessed in a direction leaving the electrode assembly; and
- an air-permeable member covering the recess, wherein the air-permeable member is configured to allow gas to be discharged to the outside of the battery cell through the recess when a gas pressure inside the battery cell reaches a threshold;
- wherein a bottom wall of the recess is provided with a protruding portion extending toward the electrode assembly, and the protruding portion is configured to be attached to the air-permeable member, so as to limit deformation of the air-permeable member in a thickness direction of the wall portion,
- an accommodating cavity communicating with the outside is formed between an outer peripheral wall of the protruding portion and an inner peripheral wall of the recess, the bottom wall of the recess is provided with a first through hole, and the first through hole is configured to allow gas circulation with an inner space of the battery cell through the accommodating cavity.

* * * * *